No. 779,550. PATENTED JAN. 10, 1905.
J. H. LEFFELMAN.
FIRE ESCAPE.
APPLICATION FILED FEB. 10, 1904.
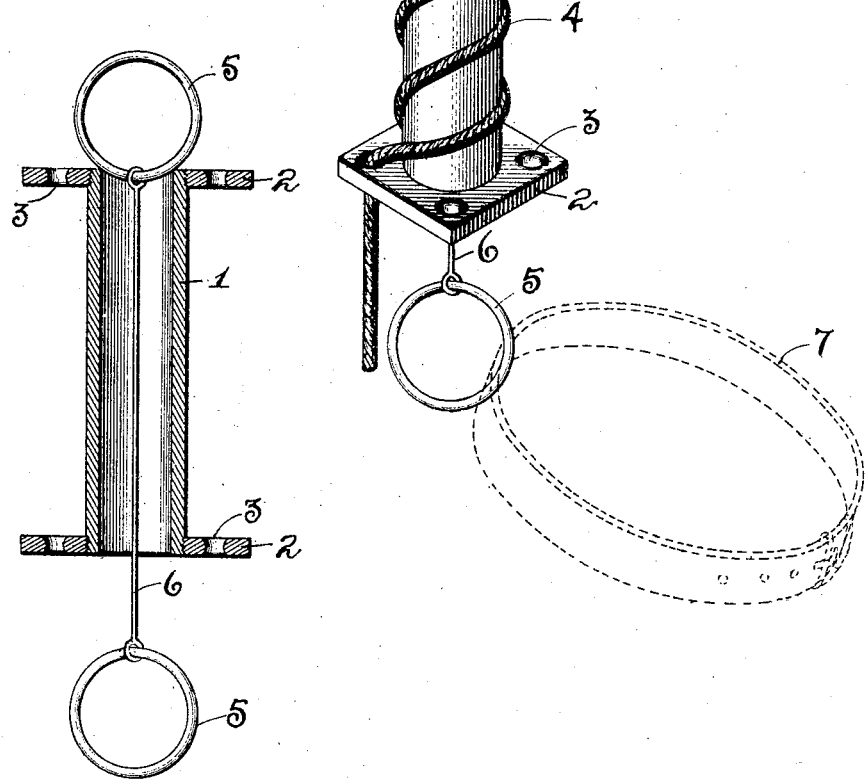

No. 779,550. Patented January 10, 1905.

UNITED STATES PATENT OFFICE.

JOHN H. LEFFELMAN, OF SUBLETTE, ILLINOIS.

FIRE-ESCAPE.

SPECIFICATION forming part of Letters Patent No. 779,550, dated January 10, 1905.

Application filed February 10, 1904. Serial No. 193,028.

*To all whom it may concern:*

Be it known that I, JOHN H. LEFFELMAN, a citizen of the United States, residing at Sublette, in the county of Lee and State of Illinois, have invented a new and useful Fire-Escape, of which the following is a specification.

My invention relates to improvements in fire-escapes in which a device is used to cause friction on the rope by which the person descends. It comprises a cylinder, preferably made of metal and having flanges on each end. The flanges are of sufficient width to permit holes being drilled through for the passage of a metal, hemp, or other rope. The rope is to pass through one of the said holes of the flanges of the cylinder and then is wound around the cylinder as many times as may be necessary to produce the required amount of friction to prevent a person from falling while escaping. The cylinder is hollow to admit the passage of a link connecting two rings, one at each end of the cylinder and which are too large to pass through the cylinder. A person using the fire-escape may attach himself to either of the rings by a belt or otherwise.

The device is illustrated in the accompanying drawings, in which—

Figure 1 is a perspective view thereof, and Fig. 2 is a sectional view.

The cylinder is indicated at 1. This is hollow, as stated, and has at each end flanges 2, having several holes 3 through the same. The rope 4, by which the escape is effected, extends through a hole in the flange at one end and is then wound around the body of the cylinder and then extends through a hole in the flange at the other end. In the operation of the device this produces the friction necessary.

5 indicates rings at each end of the cylinder, connected by the link 6, which passes therethrough. The rings permit the attachment of the user of the device, as by a belt 7.

The device is simple and may be cheaply constructed. Its operation is evident from the above description and the drawings.

What I claim as new, and desire to secure by Letters Patent, is—

A fire-escape comprising a cylinder, a rope wound and slidable around the same, means at each end of the cylinder to prevent the rope slipping off the cylinder, and a link extending through the cylinder and having at each end a ring which will not pass through the cylinder.

In testimony whereof I have signed my name to this specification in the presence of two subscribing witnesses.

JOHN H. LEFFELMAN.

Witnesses:
 GEORGE LAESER,
 WILLIAM E. EASTER.